United States Patent
Wu et al.

(10) Patent No.: US 10,171,299 B2
(45) Date of Patent: Jan. 1, 2019

(54) METHOD AND APPARATUS FOR CONFIGURING PROXY SERVER

(71) Applicant: Tencent Technology (Shenzhen) Company Limited, Shenzhen (CN)

(72) Inventors: Mengqing Wu, Shenzhen (CN); Ning Zhang, Shenzhen (CN); Jinzhou Jiang, Shenzhen (CN); Liang Kang, Shenzhen (CN); Yuelong Teng, Shenzhen (CN); Yuguo Liu, Shenzhen (CN); Zhenxing Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 495 days.

(21) Appl. No.: 14/618,010

(22) Filed: Feb. 10, 2015

(65) Prior Publication Data
US 2015/0156069 A1    Jun. 4, 2015

Related U.S. Application Data
(63) Continuation of application No. PCT/CN2013/081722, filed on Aug. 19, 2013.

(30) Foreign Application Priority Data
Aug. 22, 2012  (CN) .......................... 2012 1 0300783

(51) Int. Cl.
*H04L 12/24*    (2006.01)
*H04L 29/08*    (2006.01)

(52) U.S. Cl.
CPC ........ *H04L 41/0816* (2013.01); *H04L 41/083* (2013.01); *H04L 67/02* (2013.01)

(58) Field of Classification Search
CPC .... H04L 41/0816; H04L 41/083; H04L 67/02
(Continued)

(56) References Cited

U.S. PATENT DOCUMENTS

| 6,092,178 A * | 7/2000 | Jindal ............... H04L 29/12009 712/27 |
| 6,795,858 B1 * | 9/2004 | Jain ..................... H04L 67/1008 709/226 |

(Continued)

FOREIGN PATENT DOCUMENTS

| CN | 101931635 A | 12/2010 |
| CN | 102624920 A | 8/2012 |

OTHER PUBLICATIONS

International Preliminary Report on Patentability and Written Opinion in International Application No. PCT/CN2013/081722 dated Feb. 24, 2015.
(Continued)

*Primary Examiner* — James E Springer
(74) *Attorney, Agent, or Firm* — Marshall, Gerstein & Borun LLP (57) ABSTRACT

A method for configuring a proxy server is disclosed. The method includes: establishing a first speed performance indicator and a second speed performance indicator, wherein the first speed performance indicator is configured for indicating a minimum threshold speed of the proxy server, and the second speed performance indicator is configured for determining whether the proxy server reaches a predefined standard speed; and selecting at least one proxy server from multiple candidate proxy servers according to the first speed performance indicator and/or the second speed performance indicator, and configuring the selected proxy server as a currently used proxy server. An apparatus for configuring a proxy server is also disclosed.

8 Claims, 4 Drawing Sheets

(58) Field of Classification Search
USPC .......................................................... 709/221
See application file for complete search history.

(56) References Cited

U.S. PATENT DOCUMENTS

| | | | |
|---|---|---|---|
| 6,829,638 | B1 | 12/2004 | McBrearty et al. |
| 7,159,013 | B2* | 1/2007 | Cudd ................ G06F 17/30902 |
| | | | 702/189 |
| 2004/0172476 | A1* | 9/2004 | Chapweske ............. H04L 29/06 |
| | | | 709/231 |
| 2009/0234968 | A1* | 9/2009 | Thomas .............. H04L 65/4084 |
| | | | 709/241 |
| 2010/0235521 | A1* | 9/2010 | French .................... G06F 15/16 |
| | | | 709/228 |
| 2011/0119388 | A1* | 5/2011 | Attanasio .............. G06F 9/5055 |
| | | | 709/227 |
| 2012/0151042 | A1* | 6/2012 | Garg .................. H04L 65/4084 |
| | | | 709/224 |
| 2012/0203864 | A1* | 8/2012 | Toth ........................ H04L 41/12 |
| | | | 709/217 |
| 2013/0103763 | A1* | 4/2013 | Zhou ..................... H04L 65/403 |
| | | | 709/204 |

OTHER PUBLICATIONS

Search Report in Application No. PCT/CN2013/081722 dated Nov. 28, 2013.

* cited by examiner

METHOD AND APPARATUS FOR CONFIGURING PROXY SERVER

CROSS-REFERENCE TO RELATED APPLICATIONS

This is a continuation of International Application No. PCT/CN2013/081722 filed Aug. 19, 2013 entitled "Method and Apparatus for Configuring Proxy Server," which claims the priority of Chinese patent application No. 201210300783.6 filed Aug. 22, 2012, the entire respective disclosures of which are incorporated herein by reference.

TECHNICAL FIELD

The present disclosure relates to internet communication technologies, and more particularly to a method and apparatus for configuring proxy servers.

BACKGROUND

Proxy server provides a forwarding function in the Internet, and is located between a client device and a Web server. A browser sends a webpage request to the proxy server, and then the proxy server forwards the webpage request to the Web server, obtains webpage data and returns the webpage data to the browser. Through configuring the proxy server, a webpage filtering function may be implemented. That is, the proxy server can filter out needless webpage information, so that the needless webpage information is not returned to the browser. The proxy server may also enhance the security protection of webpage view. That is, the proxy server can intercept or eliminate insecure webpage information, and then returns secure webpage data to the browser.

However, if an IP address of the proxy server changes or an access speed of the proxy server is too slow, the browser cannot be connected to the proxy server or the access speed is too slow, and thus the proxy server cannot return the webpage data to the browser in time. In this way, the browser cannot access the webpage or the access speed is too slow, thereby influencing a user on Internet access.

SUMMARY OF THE INVENTION

Examples of the present disclosure provide a method and apparatus for configuring a proxy server, so as to solve a problem that the proxy server cannot return webpage data to a browser in time because the browser cannot be connected to the proxy server or an access speed of the proxy server is too slow.

The solution of the present disclosure is implemented as follows.

A method for configuring a proxy server includes:

establishing a first speed performance indicator and a second speed performance indicator, wherein the first speed performance indicator is configured for indicating a minimum threshold speed of the proxy server, and the second speed performance indicator is configured for determining whether the proxy server reaches a predefined standard speed; and selecting at least one proxy server from multiple candidate proxy servers according to the first speed performance indicator and/or the second speed performance indicator, and configuring the selected proxy server as a currently used proxy server.

An apparatus for configuring a proxy server includes an establishing module and a configuring module, where the establishing module is to establish a first speed performance indicator and a second speed performance indicator, wherein the first speed performance indicator is configured for indicating a minimum threshold speed of the proxy server, and the second speed performance indicator is configured for determining whether the proxy server reaches a predefined standard speed; and the configuring module is to select at least one proxy server from multiple candidate proxy servers according to the first speed performance indicator and/or the second speed performance indicator established by the establishing module, and configure the selected proxy server as a currently used proxy server.

In the method and apparatus for configuring the proxy server, the proxy server with better performance can be automatically selected as the currently used proxy server, and the automatic configuration or adjustment of the proxy server can be implemented, thereby solving the problem that a user cannot access the Internet because the browser cannot be connected to the proxy server or the access speed of the proxy server is too slow.

DETAILED DESCRIPTION

Figure 1:
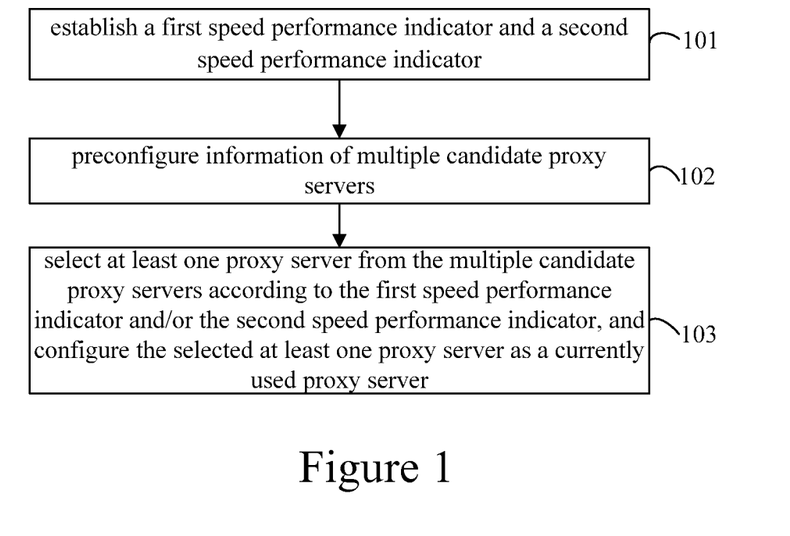
FIG. 1 is a schematic diagram illustrating a method for configuring a proxy server according to an example of the present disclosure.

FIG. 1 is a schematic diagram illustrating a method for configuring a proxy server according to an example of the present disclosure. As shown in FIG. 1, the method includes following processes.

In process 101, establish a first speed performance indicator and a second speed performance indicator, where the first speed performance indicator is configured for indicating a minimum threshold speed of the proxy server, and the second speed performance indicator is configured for determining whether the proxy server reaches a predefined standard speed.

In process 102, preconfigure information of multiple candidate proxy servers.

Herein, the information of proxy server includes the IP address and port of the proxy server.

In process 103, select at least one proxy server from the multiple candidate proxy servers according to the first speed performance indicator and/or the second speed performance indicator, and configure the selected at least one proxy server as a currently used proxy server.

Herein, the sequence of performing process 101 and process 102 is not limited, and process 101 and process 102 may be performed synchronously.

The process of selecting at least one proxy server from the multiple candidate proxy servers according to the first speed performance indicator and/or the second speed performance indicator includes: obtaining performance parameters of each proxy server, calculating an access speed of each proxy server, and comparing the access speed of each proxy server with the first speed performance indicator to obtain proxy servers each of which is configured with a speed equal to or higher than the minimum threshold speed; comparing the access speeds of the proxy servers equal to or higher than the minimum threshold speed with the second speed performance indicator to obtain proxy servers each of which is configured with a speed equal to or higher than the standard speed; and comparing the performance of the obtained proxy servers after comparisons, and selecting at least one proxy server with the best speed performance.

The performance parameters of the proxy server include duration required for returning data of at least one pre-defined or pre-stored website (that is, a commonly used website) by the proxy server, and the access speed of the proxy server is the duration required for returning the data of the commonly used website by the proxy server. Or, the performance parameters of the proxy server include the duration required for returning the data of the commonly used website by the proxy server, a Time value and a Time To Live (TTL) value, and the access speed of the proxy server is a sum of the Time value, the TTL value and the duration required for returning the data of the commonly used website by the proxy server. In practical applications, the browser pre-stores a website often accessed by a user or a website configured by the user, and takes the stored website as the commonly used website.

The process of comparing the performance of the proxy servers reaching the standard speed includes: comparing the access speeds of the proxy servers, and selecting at least one proxy server with the lowest access speed. The process of comparing the performance of the proxy servers reaching the standard speed further includes: if the number of the proxy servers with the lowest access speed is greater than 1, comparing the number of jump times of parsing Domain Name Service (DNS) for the commonly used website by one proxy server with the number of jump times of parsing the DNS for the commonly used website by another proxy server, and selecting at least one proxy server with the minimum number of jump times.

Before selecting at least one proxy server from the multiple candidate proxy servers, the method further includes prompting the user whether to reconfigure the proxy server. At this time, the process of selecting at least one proxy server from the multiple proxy servers includes: when receiving an instruction indicating that the user allows reconfiguring the proxy server, selecting at least one proxy server from the multiple proxy servers.

Before selecting at least one proxy server from the multiple candidate proxy servers, the method further includes: determining whether the performance of the currently used proxy server reaches the second speed performance indicator, and prompting the user whether to reconfigure the proxy server when the performance of the currently used proxy server does not reach the second speed performance indicator. The process of selecting at least one proxy server from the multiple proxy servers includes: when receiving an instruction indicating that the user allows reconfiguring the proxy server, selecting at least one proxy server from the multiple proxy servers.

After selecting two or more proxy servers from the multiple candidate proxy servers and configuring the selected proxy servers as the currently used proxy servers, the method further includes: according to a predefined data downloading policy, instructing each proxy server to obtain respective different portions of data of to-be-accessed webpage; receiving the portions of data of to-be-accessed webpage returned by each proxy server; combining portions of data of to-be-accessed webpage returned by the two or more proxy servers to obtain the to-be-accessed webpage, and displaying the to-be-accessed webpage.

After selecting one proxy server from the multiple candidate proxy servers and configuring the selected proxy server as the currently used proxy server, the method further includes: receiving the data of to-be-accessed webpage obtained by the proxy server to obtain the to-be-accessed webpage, and displaying the to-be-accessed webpage.

Figure 4:
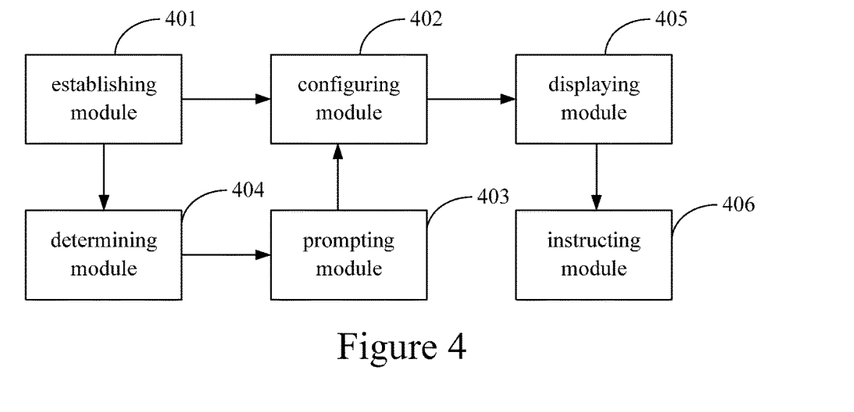
FIG. 4 is a schematic diagram illustrating an apparatus for configuring a proxy server according to an example of the present disclosure.

FIG. 4 is a schematic diagram illustrating an apparatus for configuring a proxy server according to an example of the present disclosure. As shown in FIG. 4, the apparatus includes an establishing module 401 and a configuring module 402. The establishing module 401 is to establish a first speed performance indicator and a second speed performance indicator, where the first speed performance indicator is configured for indicating a minimum threshold speed of the proxy server, and the second speed performance indicator is configured for determining whether the proxy server reaches a predefined standard speed. The configuring module 402 is to select at least one proxy server from multiple candidate proxy servers according to the first speed performance indicator and/or the second speed performance indicator, and configure the selected proxy server as a currently used proxy server.

The configuring module 402 is to obtain performance parameters of each proxy server, calculate an access speed of each proxy server, and compare the access speed of each proxy server with the first speed performance indicator to obtain proxy servers each of which is configured with a speed equal to or higher than the minimum threshold speed; compare the access speeds of the proxy servers equal to or higher than the minimum threshold speed with the second speed performance indicator to obtain proxy servers each of which is configured with a speed equal to or higher than the standard speed; and compare the performance of the obtained proxy servers after comparisons, and select at least one proxy server with the best speed performance. The performance parameters of the proxy server include: duration required for returning data of the commonly used website by the proxy server, and the access speed of the proxy server is the duration required for returning the data of the commonly used website by the proxy server. Or, the performance parameters of the proxy server include: the duration required for returning the data of the commonly used website by the proxy server, a Time value and a TTL value, and the access speed of the proxy server is a sum of the Time value, the TTL value and the duration required for returning the data of the commonly used website by the proxy server.

The configuring module 402 is to compare the access speeds of the proxy servers, and select at least one proxy server with the lowest access speed. The configuring module 402 is to, if the number of the proxy servers with the lowest access speed is greater than 1, compare the number of jump times of parsing DNS for the commonly used website by one proxy server with the number of jump times of parsing the DNS for the commonly used website by another proxy server, and select at least one proxy server with the minimum number of jump times.

The apparatus further includes a prompting module 403. The prompting module 403 is to prompt the user whether to reconfigure the proxy server. The configuring module 402 is to, when receiving an instruction indicating that the user allows reconfiguring the proxy server, select at least one proxy server from the multiple proxy servers.

The apparatus further includes a determining module 404. The determining module 404 is to determine whether the performance of the currently used proxy server reaches the second speed performance indicator, and when the performance of the currently used proxy server does not reach the second speed performance indicator, notify the prompting module 403 to prompt the user whether to reconfigure the proxy server.

The apparatus further includes a displaying module 405. The displaying module 405 is to receive data of to-be-accessed webpage obtained and returned by the proxy server selected by the configuring module 402 to obtain the to-be-accessed webpage, and display the to-be-accessed webpage.

The apparatus further includes an instructing module 406. The instructing module 406 is to, according to a predefined data downloading policy, instruct each of two or more proxy servers selected by the configuring module 402 to obtain respective different portions of data of a to-be-accessed webpage; and the displaying module 405 is further to receive the portions of data of the to-be-accessed webpage returned by each proxy server, combine portions of data of the to-be-accessed webpage returned by the two or more proxy servers to obtain the to-be-accessed webpage, and display the to-be-accessed webpage.

In practical applications, the apparatus for configuring the proxy server may be may be a browser plug-in or a browser.

Figure 5:
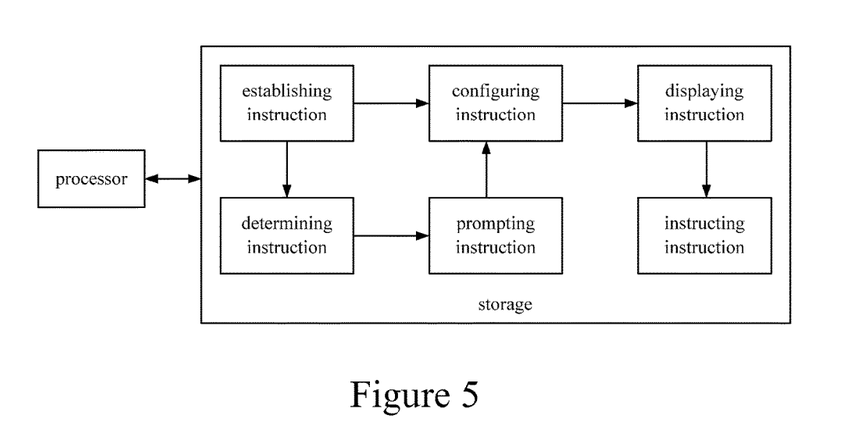
FIG. 5 is a schematic diagram illustrating an apparatus for configuring a proxy server according to another example of the present disclosure.

FIG. 5 is a schematic diagram illustrating an apparatus for configuring a proxy server according to another example of the present disclosure. As shown in FIG. 5, the apparatus for configuring a proxy server at least includes storage and a processor communicated with the storage. The storage includes an establishing instruction and a configuring instruction which can be executed by the processor.

The establishing instruction is to establish a first speed performance indicator and a second speed performance indicator, where the first speed performance indicator is configured for indicating a minimum threshold speed of the proxy server, and the second speed performance indicator is configured for determining whether the proxy server reaches a predefined standard speed; and the configuring instruction is to select at least one proxy server from multiple candidate proxy servers according to the first speed performance indicator and/or the second speed performance indicator established by the establishing instruction, and configure the selected proxy server as a currently used proxy server.

The configuring instruction is to obtain performance parameters of each proxy server, calculate an access speed of each proxy server; compare the access speed of each proxy server with the first speed performance indicator to obtain proxy servers each of which is configured with a speed equal to or higher than the minimum threshold speed; compare the access speeds of the proxy servers equal to or higher than the minimum threshold speed with the second speed performance indicator to obtain proxy servers each of which is configured with a speed equal to or higher than the standard speed; and compare the performance of the obtained proxy servers after comparisons, and select at least one proxy server with the best speed performance.

The performance parameters of each proxy server includes duration required for returning data of a predefined or pre-stored website by the proxy server, and the access speed of the proxy server is the duration required for returning data of a predefined or pre-stored website by the proxy server; or the performance parameters of the proxy server include the duration required for returning the data of the predefined or pre-stored website by the proxy server, a Time value and a Time To Live (TTL) value, and the access speed of the proxy server is a sum of the Time value, the TTL value and the duration required for returning the data of the predefined or pre-stored website by the proxy server.

The configuring instruction is to compare the access speeds of the proxy servers, and select at least one proxy server with the lowest access speed.

The configuring instruction is to, if the number of the proxy servers with the lowest access speed is greater than 1, compare the number of jump times of parsing Domain Name Service (DNS) for the predefined or pre-stored website by one proxy server with the number of jump times of parsing the DNS for the predefined or pre-stored website by another proxy server, and select at least one proxy server with the minimum number of jump times.

The apparatus further includes a prompting instruction, where the prompting instruction is to prompt a user whether to reconfigure the proxy server; and the configuring instruction is to, when receiving an instruction indicating that the user allows reconfiguring the proxy server, select at least one proxy server from the multiple candidate proxy servers.

The apparatus further includes a determining instruction, where the determining instruction is to determine whether the performance of the currently used proxy server conform to the second speed performance indicator, and when the performance of the currently used proxy server does not conform to the second speed performance indicator, notify the prompting instruction to prompt the user whether to reconfigure the proxy server.

The apparatus further includes a displaying instruction, where the displaying instruction is to receive data of a to-be-accessed webpage obtained by the proxy server selected by the configuring instruction to obtain the to-be-accessed webpage, and display the to-be-accessed webpage.

The apparatus further includes an instructing instruction, where the instructing instruction is to, according to a predefined data downloading policy, instruct each of two or more proxy servers selected by the configuring instruction to obtain respective different portions of data of a to-be-accessed webpage; and the displaying instruction is further to receive the portions of data of the to-be-accessed webpage returned by each proxy server, combine portions of data of the to-be-accessed webpage returned by the two or more proxy servers to obtain the to-be-accessed webpage, and display the to-be-accessed webpage.

Figure 2:
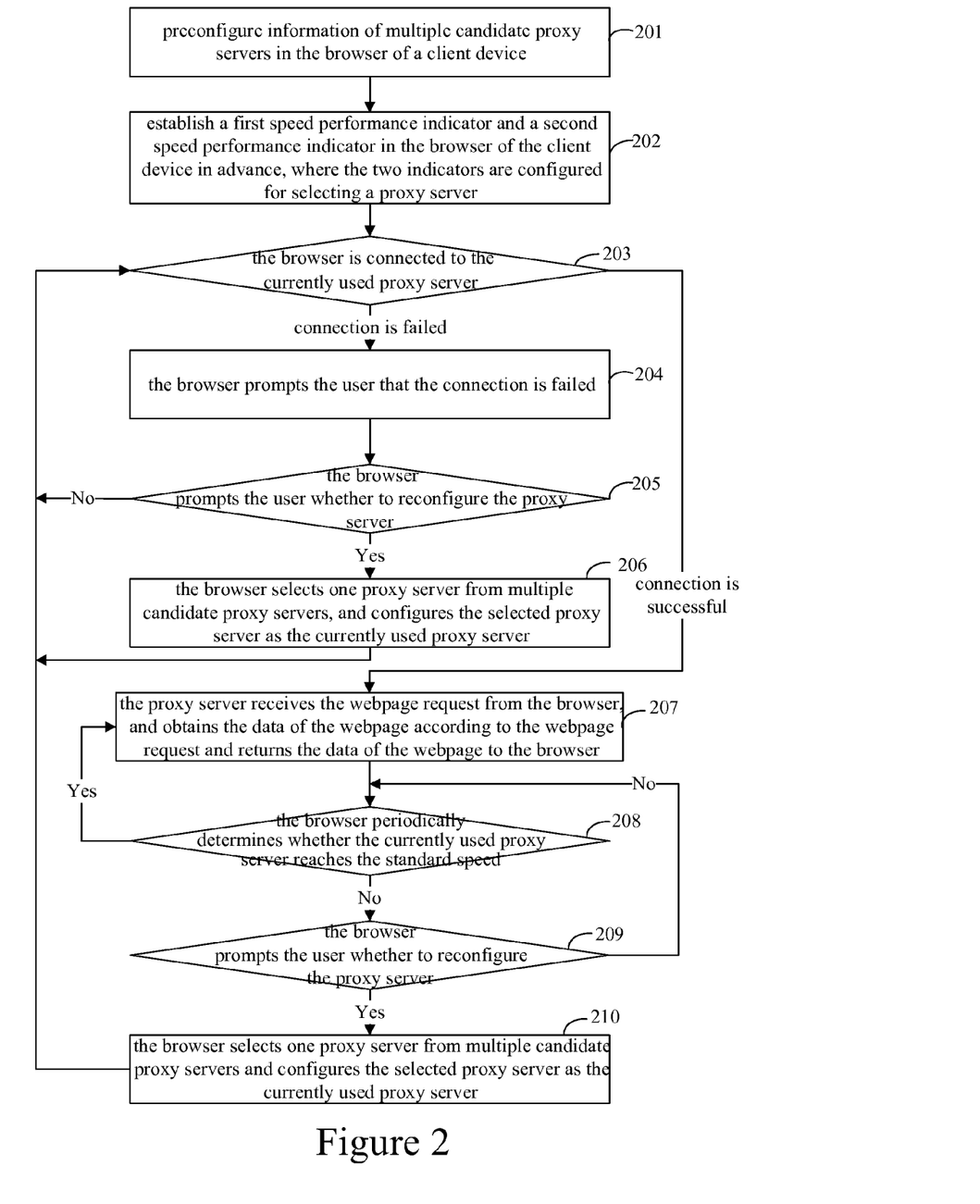
FIG. 2 is a schematic diagram illustrating a method of accessing a webpage by a browser through configuring one proxy server according to a first example of the present disclosure.

FIG. 2 is a schematic diagram illustrating a method of accessing a webpage by a browser through configuring one proxy server according to a first example of the present disclosure. In this example, the method includes following processes.

In process 201, preconfigure information of multiple candidate proxy servers in the browser of a client device.

Herein, the information of the multiple candidate proxy servers includes the IP address and port of each proxy server.

In process 202, establish a first speed performance indicator and a second speed performance indicator in the browser of the client device in advance, where the first speed performance indicator and the second speed performance indicator are configured for selecting a proxy server.

The first speed performance indicator is configured for determining whether a currently used proxy server is to be replaced, and indicating a minimum threshold speed of the proxy server. When an access speed of the proxy server does not reach the first speed performance indicator, the browser prompts the user to replace the proxy server. The second speed performance indicator is configured for indicating a predefined standard speed and determining whether the currently used proxy server reaches the predefined standard speed. The second speed performance indicator is prior to the first speed performance indicator. When the performance of the currently used proxy server does not conform to the second speed performance indicator, the browser prompts the user that the currently used proxy server does not reach the predefined standard speed, and prompts the user to switch to a proxy server having more advantages.

The first speed performance indicator is obtained through counting the data obtaining performance of the proxy server by the browser of the client device and is configured in the browser of the client device. The second speed performance indicator is predetermined by the user and is configured in the browser of the client device.

In process 203, the browser is connected to the currently used proxy server. That is, according to the IP address and port of the currently used proxy server, the browser sends to the currently used proxy server a webpage request for indicating to access a designated webpage. If the connection is successful, process 207 is performed; if the connection is failed, process 204 is performed.

In practical applications, the webpage request includes the Universal Resource Locator (URL) of the webpage, and the proxy server may obtain data of the webpage according to the URL of the webpage.

In process 204, the browser prompts the user that the connection is failed.

In process 205, the browser prompts the user whether to reconfigure the proxy server. If it is needed to reconfigure the proxy server, process 206 is performed; otherwise, process 203 is performed, that is, the browser is still connected to the currently used proxy server.

In process 206, the browser selects one proxy server from multiple candidate proxy servers, and configures the selected proxy server as the currently used proxy server, and then process 203 is performed.

Herein, the process of configuring the selected proxy server as the currently used proxy server includes: configuring information including the IP address and port of the selected proxy server in the client device. In practical applications, the browser configures the information of the proxy server in a cache. When the browser sends the webpage request, the browser reads the information including the IP address and port of the proxy server from the cache, and sends the webpage request to the proxy server based on the information.

The browser obtains the duration required for returning data of the commonly used website by each proxy server and the connection performance parameters of each proxy server, calculates the access speed of each proxy server, compares the access speed of each proxy server with the first speed performance indicator to obtain proxy servers each of which is configured with a speed equal to or higher than the minimum threshold speed, compares the access speeds of the proxy servers equal to or higher than the minimum threshold speed with the second speed performance indicator to obtain proxy servers each of which is configured with a speed equal to or higher than the standard speed, compares the performance of the obtained proxy servers after comparisons, and selects a proxy server with the best speed performance.

If there are two or more proxy servers each of which is configured with a speed equal to or higher than the minimum threshold speed but there is no proxy server reaching the standard speed, the browser compares the performance of the proxy servers each of which is configured with a speed equal to or higher than the minimum threshold speed, and selects a proxy server with the best speed performance.

The performance parameters of the proxy server include a Time value and a TTL value. The process of calculating the access speed of each proxy server includes adding the duration for returning the data of the commonly used website by the proxy server, the Time value and the TTL value together to obtain the access speed of the proxy server.

The browser obtains the number of jump times of parsing a DNS for the commonly used website by the proxy server. When comparing the performance of the proxy servers, the browser compares the access speeds of the proxy servers, selects a proxy server with the lowest access speed. If there is one proxy server with the lowest access speed, the browser selects the proxy server. If there are two or more proxy servers whose access speeds are close, the browser compares the number of jump times of parsing the DNS for the commonly used website by one proxy server with the number of jump times of parsing the DNS for the commonly used website by another proxy server, and selects a proxy server with the minimum number of jump times. If there are two or more proxy servers whose access speeds are close and the number of jump times of parsing the DNS for the commonly used website by one proxy server is the same as the number of jump times of parsing the DNS for the commonly used website by another proxy server, the browser randomly selects one proxy server from the two or more proxy servers.

Herein, the access speeds are close, which refers to that the access speeds belong to a predefined value range or are equal, or the difference of the access speeds is in a predefined allowable error range.

In process 207, the proxy server receives the webpage request from the browser, and obtains the data of the webpage according to the webpage request and returns the data of the webpage to the browser.

After the browser receives the data of the webpage returned by the proxy server, the browser displays the data of the webpage. In practical applications, after the proxy server returns the data of the webpage to the browser, the browser saves the data of the webpage in a cache firstly, and then reads the data of the webpage from the cache and displays the data to the user.

In process 208, the browser periodically determines whether the currently used proxy server reaches the standard speed; if yes, process 207 is performed, otherwise, process 209 is performed.

The browser obtains the duration required for returning the data of the commonly used website in a period of time by the proxy server, and compares the duration with the second speed performance indicator. If the duration is not larger than the second speed performance indicator, the browser determines that the currently used proxy server can reach the standard speed, and if the duration is larger than the second speed performance indicator, determines that the currently used proxy server cannot reach the standard speed.

In process 209, the browser prompts the user that the currently used proxy server cannot reach the standard speed, and prompts the user whether to reconfigure the proxy server. If it is needed to reconfigure the proxy server, process 210 is performed; otherwise, process 208 is performed.

In process 210, the browser selects one proxy server from multiple candidate proxy servers and configures the selected proxy server as the currently used proxy server, and process 203 is performed; if there is no proxy server reaching the standard speed, process 207 is performed.

The browser obtains the duration required for returning the data of the commonly used website by each proxy server and the connection performance parameters of each proxy server, calculates the access speed of each proxy server, compares the access speed of each proxy server with the second speed performance indicator to obtain proxy servers reaching the standard speed. If there are two or more proxy servers reaching the standard speed, the browser compares the performance of the proxy servers reaching the standard speed, and selects a proxy server with the best speed performance. If there is one proxy server reaching the standard speed, the browser selects the proxy server as the currently used proxy server. If there is no proxy server reaching the standard speed, process 207 is performed, and the browser prompts the user that there is no proxy server reaching the standard speed.

In practical applications, when the browser prompts the user that the connection is failed or whether to reconfigure the proxy server, the browser may display a dialog box containing prompting information to the user. When the browser prompts the user whether to reconfigure the proxy server, the browser provides selection keys including "yes" and "no" in the dialog box. When the user selects "yes", the browser receives an instruction indicating that user allows reconfiguring the proxy server; when the user selects "no", the browser receives an instruction indicating that user rejects to reconfigure the proxy server In this example, processes 208 to 120 are optional.

If the browser obtains video stream data of the commonly used website through the proxy server, the browser obtains duration required for returning the video stream data of the commonly used website by each proxy server, and performs the above processes according to the duration. If the browser obtains picture data of the commonly used website through the proxy server, the browser obtains duration required for returning the picture data of the commonly used website by each proxy server, and performs the above processes according to the duration.

Figure 3:
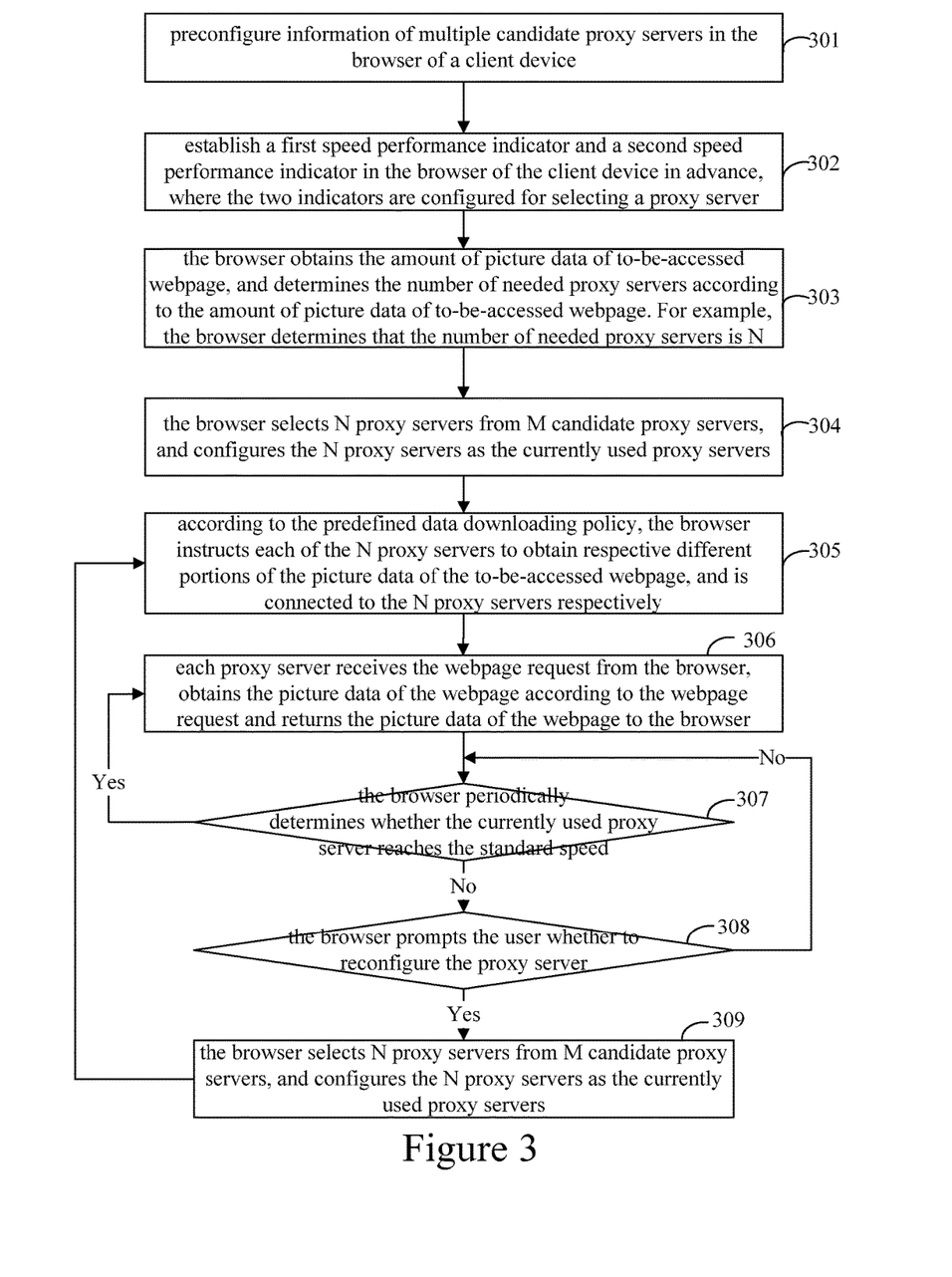
FIG. 3 is a schematic diagram illustrating a method of accessing a webpage by a browser through configuring two or more proxy servers according to a second example of the present disclosure.

In a second example, a method of accessing a webpage by the browser through configuring two or more proxy servers is shown in FIG. 3. The method includes following processes.

Processes 301 and 302 are the same as processes 201 and 202.

In process 303, the browser obtains the amount of picture data of to-be-accessed webpage, and determines the number of needed proxy servers according to the amount of picture data of to-be-accessed webpage. For example, the browser determines that the number of needed proxy servers is N.

Suppose the browser saves information of M candidate proxy servers in advance, where M is an integer greater than 1, N is an integer not smaller than 1, and N is not larger than M.

The browser may obtain the amount of picture data of the to-be-accessed webpage from a Hypertext Markup Language (HTML) source of the to-be-accessed webpage, and determines the number of needed proxy servers according to a predefined data downloading policy. The predefined data downloading policy may indicate an amount threshold of picture data managed by one proxy server. After the browser obtains the amount of all picture data of the webpage, the number of needed proxy servers may be determined according to the amount of all picture data and the amount threshold of picture data.

In process 304, the browser selects N proxy servers from M candidate proxy servers, and configures the N proxy servers as the currently used proxy servers.

The process of configuring the N proxy servers as the currently used proxy servers includes that the browser configures information including the IP addresses and ports of the N proxy servers in the local.

The process of selecting N proxy servers from M candidate proxy servers by the browser is similar to process 206 except that the number of the selected proxy servers is different from that in process 206, and is not illustrated in detail herein. If M is equal to N, the browser directly takes the M candidate proxy server as the currently used proxy servers without selecting the proxy servers.

In process 305, according to the predefined data downloading policy, the browser instructs each of the N proxy servers to obtain respective different portions of the picture data of the to-be-accessed webpage, and is connected to the N proxy servers respectively. That is, the browser sends to each of the N proxy servers the webpage request indicating to obtain respective different portions of the picture data of the to-be-accessed webpage.

The browser may instruct each proxy server to obtain respective different portions of the picture data according to the predefined data downloading policy. For example, if there are ten pictures and the amount threshold of picture data managed by one proxy server is 5, it can be determined that two proxy servers are needed. After two proxy servers are selected from M proxy servers, the browser may instruct one proxy server to obtain five pictures of the to-be-accessed webpage, and instruct the other proxy server to obtain remained five pictures of the to-be-accessed webpage. That is, the data downloading policy only needs to indicate the amount threshold of picture data managed by one proxy server. As long as the picture data are not obtained repeatedly and the amount of picture data is not larger than the amount threshold, the picture data may be obtained randomly by the proxy servers.

In process 306, each proxy server receives the webpage request from the browser, obtains the picture data of the webpage according to the webpage request and returns the picture data of the webpage to the browser.

After the browser receives the data of the webpage returned by each proxy server, the browser combines the data returned by the proxy servers according to the HTML source of the to-be-accessed webpage to obtain the webpage, and displays the webpage to the user. In practical applications, after each proxy server returns the data of the webpage to the browser, the browser saves the data of the webpage in the cache, reads the data of the webpage from the cache after receiving all data of the webpage, combines the data and displays the data to the user.

Processes 307 to 309 are similar to processes 208 to 210, and the difference lies in: in processes 307 and 308, there are N currently used proxy servers, and in process 309, the browser selects N proxy servers from M candidate proxy servers, and configures the N proxy servers as the currently used proxy servers.

In this example, processes 307 to 309 are optional.

In the examples of the present disclosure, before the proxy server is configured, the user is prompted whether to reconfigure the proxy server, thereby improving the flexibility of configuring the proxy server.

Based on the second speed performance indicator, the user is prompted in real time to switch the currently used proxy server to the proxy server with better performance, thereby improving the flexibility of configuring the proxy server.

In this example, the webpage request of the browser is processed together by multiple proxy servers, and the multiple proxy servers respectively obtain the data of the webpage and return the data of the webpage to the browser, which can fasten the transmission speed greatly. When the to-be-accessed webpage includes a few pictures, for example, the number of pictures in the webpage is not larger than the amount threshold of picture data, only one proxy server is selected, which avoids resource waste.

It should be noted that, for a webpage request that cannot be decomposed/combined, e.g., a webpage request for a video, the webpage request for the video cannot be processed together by multiple proxy servers. That is to say, the method in this example is only applicable to a webpage request that can be decomposed/combined.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

What is claimed is:

1. A method for configuring a proxy server, the method comprising:
   establishing, by a computing device, a first speed performance indicator and a second speed performance indicator, the first speed performance indicator configured for indicating a minimum threshold speed of the proxy server, and the second speed performance indicator configured for determining whether the proxy server reaches a predefined standard speed; and
   selecting, by the computing device, at least one proxy server from multiple candidate proxy servers according to the first speed performance indicator and/or the second speed performance indicator; and
   configuring, by the computing device, the selected proxy server as a currently used proxy server;
   wherein the selecting at least one proxy server from the multiple candidate proxy servers according to the first speed performance indicator and/or the second speed performance indicator comprises:
   obtaining, by the computing device, performance parameters of each proxy server, and calculating access speed of each proxy server;
   comparing, by the computing device, the access speed of each proxy server with the first speed performance indicator to obtain proxy servers each of which is configured with a speed equal to or higher than the minimum threshold speed;
   comparing, by the computing device, the access speeds of the proxy servers equal to or higher than the minimum threshold speed with the second speed performance indicator to obtain proxy servers each of which is configured with a speed equal to or higher than the standard speed; and
   comparing, by the computing device, the performance of the obtained proxy servers after comparisons, and selecting at least one proxy server with the best speed performance;
   wherein before the selecting at least one proxy server from the multiple candidate proxy servers, the method further comprises:
   prompting, by the computing device, a user whether to reconfigure the proxy server;
   wherein the selecting at least one proxy server from the multiple candidate proxy servers comprises:
   when receiving an instruction indicating that the user allows reconfiguring the proxy server, selecting, by the computing device, at least one proxy server from the multiple candidate proxy servers;
   wherein:
   the performance parameters of each proxy server comprises duration required for returning data of a predefined or pre-stored website by the proxy server, and the access speed of the proxy server is the duration required for returning the data of a commonly visited website by the proxy server; or
   the performance parameters of each proxy server comprises duration required for returning data of a predefined or pre-stored website by the proxy server, a Time value and a Time To Live (TTL) value, and the access speed of the proxy server is a sum of the Time value, the TTL value and the duration required for returning the data of the predefined or pre-stored website by the proxy server;
   wherein the comparing the performance of the proxy servers reaching the standard speed and selecting at least one proxy server with the best speed performance comprises:
   comparing, by the computing device, the access speeds of the proxy servers, and selecting at least one proxy server with the lowest access speed;
   wherein the comparing the performance of the proxy servers reaching the standard speed and selecting at least one proxy server with the best speed performance further comprises:
   if the number of the proxy servers with the lowest access speed is greater than 1, comparing, by the computing device, the number of jump times of parsing Domain Name Service (DNS) for the predefined or pre-stored website by one proxy server with the number of jump times of parsing the DNS for the predefined or pre-stored website by another proxy server, and selecting at least one proxy server with the minimum number of jump times.

2. The method of claim 1, before the prompting the user whether to reconfigure the proxy server, further comprising:
   determining, by the computing device, whether the performance of the currently used proxy server conforms to the second speed performance indicator; and
   wherein the prompting the user whether to reconfigure the proxy server comprises:
   prompting, by the computing device, the user whether to reconfigure the proxy server when the performance of the currently used proxy server does not conform to the second speed performance indicator.

3. The method of claim 1, after two or more proxy servers are selected from the multiple candidate proxy servers and the selected proxy servers are configured as the currently used proxy servers, further comprising:
   according to a predefined data downloading policy, instructing, by the computing device, the selected proxy servers to obtain respective different portions of data of a to-be-accessed webpage;

receiving, by the computing device, the portions of data of the to-be-accessed webpage returned by each proxy server; and combining, by the computing device, portions of data of the to-be-accessed webpage returned by the two or more proxy servers to obtain the to-be-accessed webpage and displaying the to-be-accessed webpage.

4. The method of claim 1, after selecting at least one proxy server from the multiple candidate proxy servers and configuring the selected proxy server as the currently used proxy server, further comprising:

receiving, by the computing device, data of a to-be-accessed webpage obtained by the proxy server to obtain the to-be-accessed webpage and displaying the to-be-accessed webpage.

5. An apparatus for configuring a proxy server, comprising a processor and a non-transitory storage, wherein the non-transitory storage is to store one or more computer readable instructions to be executed by the processor, and the one or more computer readable instructions comprise an establishing instruction and a configuring instruction, wherein the processor executes the establishing instruction to establish a first speed performance indicator and a second speed performance indicator, wherein the first speed performance indicator is configured for indicating a minimum threshold speed of the proxy server, and the second speed performance indicator is configured for determining whether the proxy server reaches a predefined standard speed; and the processor executes the configuring instruction to select at least one proxy server from multiple candidate proxy servers according to the first speed performance indicator and/or the second speed performance indicator, and configure the selected proxy server as a currently used proxy server;

wherein the processor executes the configuring instruction to obtain performance parameters of each proxy server, calculate an access speed of each proxy server; compare the access speed of each proxy server with the first speed performance indicator to obtain proxy servers each of which is configured with a speed equal to or higher than the minimum threshold speed; compare the access speeds of the proxy servers equal to or higher than the minimum threshold speed with the second speed performance indicator to obtain proxy servers each of which is configured with a speed equal to or higher than the standard speed; and compare the performance of the obtained proxy servers after comparisons, and select at least one proxy server with the best speed performance;

wherein the one or more computer readable instructions further comprise a prompting instruction, and the processor executes the prompting instruction to prompt a user whether to reconfigure the proxy server; and the processor executes the configuring instruction to, when receiving an instruction indicating that the user allows reconfiguring the proxy server, select at least one proxy server from the multiple candidate proxy servers;

wherein the performance parameters of each proxy server comprises duration required for returning data of a predefined or pre-stored website by the proxy server, and the access speed of the proxy server is the duration required for returning data of a commonly used website by the proxy server; or the performance parameters of the proxy server include the duration required for returning the data of the predefined or pre-stored website by the proxy server, a Time value and a Time To Live (TTL) value, and the access speed of the proxy server is a sum of the Time value, the TTL value and the duration required for returning the data of the predefined or pre-stored website by the proxy server;

wherein the processor executes the configuring instruction to compare the access speeds of the proxy servers, and select at least one proxy server with the lowest access speed; and wherein the processor executes the configuring instruction to, if the number of the proxy servers with the lowest access speed is greater than 1, compare the number of jump times of parsing Domain Name Service (DNS) for the predefined or pre-stored website by one proxy server with the number of jump times of parsing the DNS for the predefined or pre-stored website by another proxy server, and select at least one proxy server with the minimum number of jump times.

6. The apparatus of claim 5, wherein the one or more computer readable instructions further comprise a determining instructions, and the processor executes the determining instruction to determine whether the performance of the currently used proxy server conform to the second speed performance indicator, and when the performance of the currently used proxy server does not conform to the second speed performance indicator, notify the prompting instruction to prompt the user whether to reconfigure the proxy server.

7. The apparatus of claim 5, wherein the one or more computer readable instructions further comprise a displaying instruction and the processor executes the displaying instruction to receive data of a to-be-accessed webpage obtained by the selected proxy server to obtain the to-be-accessed webpage, and display the to-be-accessed webpage.

8. The apparatus of claim 7, wherein the one or more computer readable instructions further comprise an instructing instruction, and the processor executes the instructing instruction to, according to a predefined data downloading policy, instruct the selected proxy servers to obtain respective different portions of data of a to-be-accessed webpage; and the processor executes the displaying instruction to receive the portions of data of the to-be-accessed webpage returned by each proxy server, combine portions of data of the to-be-accessed webpage returned by the two or more proxy servers to obtain the to-be-accessed webpage, and display the to-be-accessed webpage.

* * * * *